J. G. AMES & P. A. AMES.
Clothes-Line Fasteners.
No. 140,234.  Patented June 24, 1873.
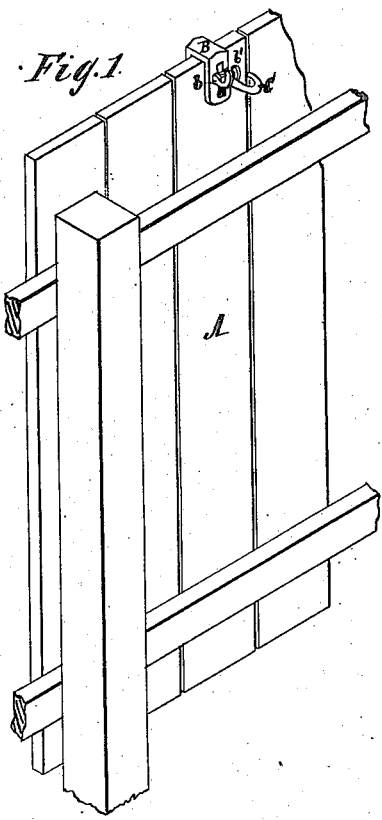
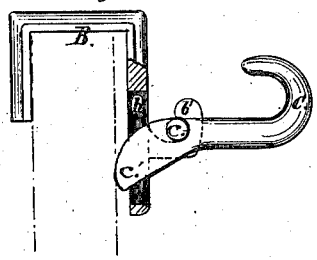
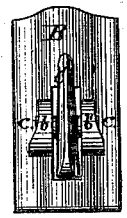

UNITED STATES PATENT OFFICE.

JOHN G. AMES AND PRESTON A. AMES, OF BALTIMORE, MARYLAND.

IMPROVEMENT IN CLOTHES-LINE FASTENERS.

Specification forming part of Letters Patent No. 140,234, dated June 24, 1873; application filed June 5, 1873.

*To all whom it may concern:*

Be it known that we, JOHN G. AMES and PRESTON A. AMES, of Baltimore city and State of Maryland, have invented a new and Improved Clothes-Line Hook and Automatic Fastening; and we do hereby declare the following to be a full, clear, and exact description of the same, reference being had to the accompanying drawing forming part of this specification, in which—

Figure 1 is a perspective view of a portion of a fence with my hook applied thereto. Figs. 2 and 3 are detail views of the hook.

The invention relates to a neat, detachable, and automatic fastening whereby clothes-lines may be secured to a yard-fence, as hereinafter fully described and subsequently claimed.

In the drawings, A represents an ordinary yard-fence, to which is usually attached the end of a clothes-line by means of a nail or hook driven into the side or top thereof. B is a rectangular fence-grapple made of metal, having the slot $b$ in its longest downwardly-projecting piece, and on each side of said slot a top open bearing, $b'$. C is the clothes-hook, which is provided with the journals $c\ c$, that rest in the bearings $b\ b'$, and with the rear-cam or projection $c'$ at an obtuse angle to the shank.

The application is as follows:

The hook C being raised in the bearings $b\ b'$ above a horizontal plane allows the grapple to pass over the top of the fence and on each side thereof, while as soon as the hook falls, or is held in a horizontal plane by the stretched clothes-line, the cam or projection $c'$ is caused to press continuously against the fence and hold the grapple firmly to it.

Having thus described our invention, what we claim as new, and desire to secure by Letters Patent, is—

An automatic hook and fastening for clothes-lines, consisting of the fence-grapple B having slot and bearings $b\ b'$, and the line-hook C having journals $c\ c$, and rear projection $c'$, together applicable in the manner described.

JOHN G. AMES,
PRESTON A. AMES.

Witnesses:
B. S. ROSEBERRY,
ALEXANDER HILL.